US012620672B2

(12) United States Patent
Li et al.

(10) Patent No.: US 12,620,672 B2
(45) Date of Patent: May 5, 2026

(54) BATTERY MODULE AND ELECTRIC VEHICLE

(71) Applicant: EVE POWER CO., LTD., Jingmen (CN)

(72) Inventors: Fan Li, Jingmen (CN); Ying Huang, Jingmen (CN); Chaohai Chen, Jingmen (CN); Zhiwei Chen, Jingmen (CN); Wencong Qiu, Jingmen (CN); Honghu Wang, Jingmen (CN); Yan Rao, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 555 days.

(21) Appl. No.: 18/002,860

(22) PCT Filed: Oct. 12, 2022

(86) PCT No.: PCT/CN2022/124958
§ 371 (c)(1),
(2) Date: Dec. 21, 2022

(87) PCT Pub. No.: WO2023/151298
PCT Pub. Date: Aug. 17, 2023

(65) Prior Publication Data
US 2024/0120606 A1      Apr. 11, 2024

(30) Foreign Application Priority Data

Feb. 11, 2022    (CN) .......................... 202210129709.6
Feb. 11, 2022    (CN) .......................... 202220281402.3

(51) Int. Cl.
*B60L 50/64*          (2019.01)
*H01M 50/213*         (2021.01)
(Continued)

(52) U.S. Cl.
CPC ........... *H01M 50/317* (2021.01); *B60L 50/64* (2019.02); *H01M 50/213* (2021.01);
(Continued)

(58) Field of Classification Search
CPC ............. H01M 50/317; H01M 50/367; H01M 50/342; H01M 50/3425; H01M 50/35;
(Continued)

(56) References Cited

U.S. PATENT DOCUMENTS 11,183,729  B2    11/2021  He et al.
2005/0053828  A1*   3/2005  Komura .................. B60R 16/04
180/68.5
(Continued)

FOREIGN PATENT DOCUMENTS

CN          110190212  A      8/2019
CN          111384328  A      7/2020
(Continued)

OTHER PUBLICATIONS

International Search Report in International application No. PCT/CN2022/124958, mailed on Oct. 12, 2022.
(Continued)

*Primary Examiner* — Jessie Walls-Murray
(74) *Attorney, Agent, or Firm* — PV IP PC; Wei Te Chung

(57) ABSTRACT

The present application provides a battery module and an electric vehicle. The battery module includes a case, a longitudinal beam, and a tray. The case is provided with at least one exhaust port. The longitudinal beam is disposed in the case and is abutted against a bottom surface of the case to partition accommodating areas in the case on both sides of the longitudinal beam along a width direction. The tray is disposed in one of the accommodating areas and is configured to install a battery cell. A through hole opposite to an (Continued)

end of the battery cell is defined on the tray, the tray is spaced from the bottom surface of the case to define a pressure relief cavity, the through hole and the exhaust port are respectively communicated with the pressure relief cavity.

18 Claims, 3 Drawing Sheets

(51) Int. Cl.
| | |
|---|---|
| *H01M 50/249* | (2021.01) |
| *H01M 50/258* | (2021.01) |
| *H01M 50/262* | (2021.01) |
| *H01M 50/317* | (2021.01) |
| *H01M 50/367* | (2021.01) |

(52) U.S. Cl.
CPC ....... *H01M 50/249* (2021.01); *H01M 50/258* (2021.01); *H01M 50/262* (2021.01); *H01M 50/367* (2021.01); *H01M 2200/20* (2013.01); *H01M 2220/20* (2013.01)

(58) Field of Classification Search
CPC ............. H01M 50/308; H01M 50/213; H01M 50/249; H01M 2220/20; H01M 50/289; B60L 50/64
See application file for complete search history.

(56) References Cited

U.S. PATENT DOCUMENTS

| | | | | |
|---|---|---|---|---|
| 2019/0081298 A1* | 3/2019 | Matecki | .................. | B60R 19/12 |
| 2021/0091438 A1* | 3/2021 | Backhaus | ........... | H01M 50/342 |
| 2021/0402884 A1 | 12/2021 | Wang et al. | | |
| 2022/0020536 A1* | 1/2022 | Hayashi | ............. | H01M 50/271 |
| 2022/0077539 A1 | 3/2022 | Ren et al. | | |
| 2022/0123427 A1 | 4/2022 | Ren et al. | | |
| 2023/0092616 A1 | 3/2023 | Lee et al. | | |
| 2024/0239175 A1* | 7/2024 | Muhr | .................... | H01M 50/24 |

FOREIGN PATENT DOCUMENTS

| | | |
|---|---|---|
| CN | 112531246 A | 3/2021 |
| CN | 215621360 U | 1/2022 |
| CN | 114006107 A | 2/2022 |
| CN | 114006124 A | 2/2022 |
| CN | 215771430 U | 2/2022 |
| CN | 114552115 A | 5/2022 |
| WO | 2021221370 A1 | 11/2021 |

OTHER PUBLICATIONS

Written Opinion of the International Search Authority in International application No. PCT/CN2022/124958, mailed on Jan. 9, 2023.
European Search Report in European application No. 22822834.2, mailed on Nov. 29, 2024.

* cited by examiner

BATTERY MODULE AND ELECTRIC VEHICLE

CROSS REFERENCE TO RELATED APPLICATIONS

This application is a National Stage Appl. filed under 35 USC 371 of International Patent Application No. PCT/CN2022/124958 with an international filing date of Oct. 20, 2022, designating the United States, now pending, and further claims priority to Chinese Patent Application Serial No. 202210129709.6 filed to China National Intellectual Property Administration (CNIPA) on Feb. 11, 2022, and Chinese Patent Application Serial No. 202220281402.3 filed to CNIPA on Feb. 11, 2022, which are incorporated by reference in the present application in its entirety.

TECHNICAL FIELD

The present application relates to the field of power battery technologies, and, more particularly, to a battery module and an electric vehicle.

BACKGROUND OF THE DISCLOSURE

In recent years, new energy vehicles have developed by leaps and bounds, especially those powered by lithium batteries. Cylindrical battery cells in the lithium batteries are widely used in power systems. Due to small capacity of a single cylindrical battery cell, quantity of batteries in a single string is large.

In cylindrical battery modules of related technology, a plurality of battery cells arranged in an array are disposed in the same sealed cavity. However, when thermal runaway occurs in a certain battery cell, an explosion-proof valve of the battery cell is opened, and gas and ejections generated inside the battery cell are discharged, which will affect the rest of the battery cells and easily lead to thermal runaway of the battery cells one after another, resulting in safety accidents.

Some battery modules are equipped with pressure relief cavities, but the plurality of battery cells still share a same pressure relief cavity. After thermal runaway occurs in a certain battery cell, it will still affect other battery cells through the pressure relief cavity, which has potential safety hazards.

SUMMARY OF THE DISCLOSURE

The present application provides a battery module, which can reduce an influence of thermal runaway of one or more battery cells on other battery cells.

In a first aspect, the present application provides a battery module, including:

a case provided with exhaust ports;

a longitudinal beam disposed in the case and abutting against a bottom surface of the case to partition accommodating areas in the case on both sides of the longitudinal beam along a width direction;

a tray disposed in one of the accommodating areas and configured to install a battery cell, wherein a through hole opposite to an end of the battery cell is defined on the tray, the tray is spaced from the bottom surface of the case to define a pressure relief cavity, and the through hole and the exhaust ports are respectively communicated with the pressure relief cavity.

The present application provides an electric vehicle which can avoid safety accidents caused by a battery module and improve a safety performance of the vehicle.

In a second aspect, the present application provides an electric vehicle, including the battery module as defined above.

1. case; 11. bottom guard plate; 111. ridge; 112. groove; 12. front side plate; 121. side plate supporting boss; 13. left and right side plates; 14. rear side plate; 2. longitudinal beam; 3. cross beam; 31. first cross beam; 32. second cross beam; 321. cross beam supporting boss; 4. tray; 41. through hole; 42. fixed boss; 5. battery cell; 6. sealing plate; 7. pressure relief valve; 8. reinforcing block; 91. tray fixed bolt; 92. second seal.

DETAILED DESCRIPTION OF THE EMBODIMENTS

In the present disclosure, unless otherwise specified and defined, terms "connect", "contact" and "fix" should be understood in a broad sense, for example, it may be a fixed connection, a detachable connection, or made as a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present disclosure can be understood according to situations.

In the present disclosure, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "above" or "up" the second feature includes that the first feature is directly above or obliquely above the second feature, or only indicate that a horizontal height of the first feature is greater than a horizontal height of the second feature. That the first feature is disposed "below", "under", or "underneath" of the second feature include that the first feature is directly below or obliquely below the second feature, or only indicate that the horizontal height of the first feature is less than the horizontal height of the second feature.

In the description of this embodiment, terms indicating orientation or location relationships such as "up", "down", "left", and "right" are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present disclosure. In addition, terms "first" and "second" are only used to distinguish in terms of description and have no special meanings.

Figure 1:
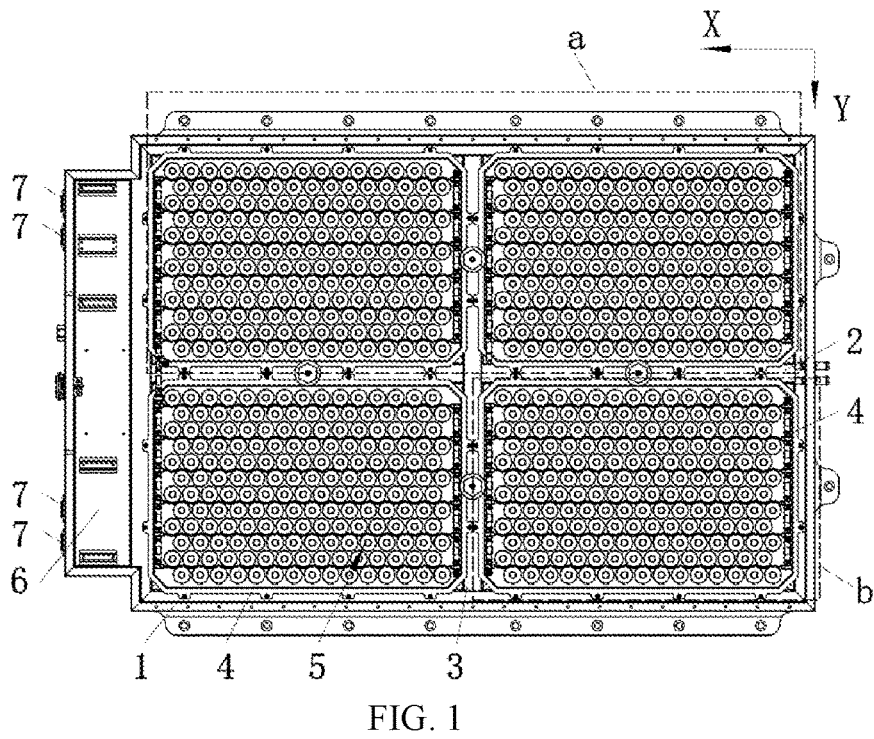
FIG. 1 is a top view of a battery module provided by the present application.
Figure 2:
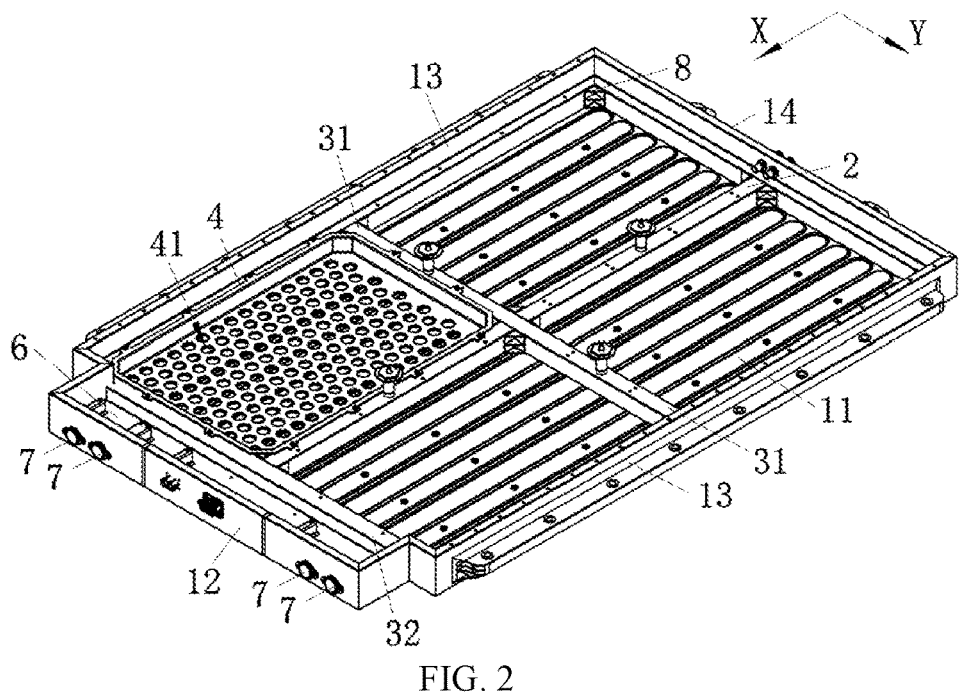
FIG. 2 is a partial schematic structural diagram of the battery module provided by the present application.

This embodiment provides a battery module, as shown in FIG. 1 and FIG. 2, the battery module includes a case 1, a longitudinal beam 2, and trays 4. The longitudinal beam 2 is disposed in the case 1 and abuts against a bottom surface of the case 1 to partition accommodating areas in the case 1 on both sides of the longitudinal beam 2 along a width direction. The accommodating areas on both sides are configured to install the trays 4. A plurality of battery cells 5 are arranged on the tray 4 to form a battery cell group. The tray 4 is provided with through holes 41 opposite to ends of the battery cells 5, and the tray (4) is spaced from the bottom surface of the case (1) to define a pressure relief cavity. The case 1 is provided with exhaust ports, and the through hole 41 and the exhaust ports are respectively communicated with the pressure relief cavity.

For example, an end of the battery cell 5 is equipped with an explosion-proof valve. When thermal runaway occurs in a certain battery cell 5, the explosion-proof valve on the battery cell 5 opens, and gas and ejections generated in the battery cell 5 enter the pressure relief cavity between the tray 4 and the bottom surface of the case 1 through the through hole 41, and are discharged through an exhaust port to avoid spontaneous combustion or explosion of the battery cell 5. In addition, with the above settings, an area of the pressure relief cavity is greater than an area of the through hole 41, and the gas released by the battery cell 5 is rapidly discharged to the pressure relief cavity through the through hole 41, and then discharged through the exhaust port after the pressure is reduced, which is conducive to improving a safety performance of the battery module. The accommodating areas located on both sides of the longitudinal beam 2 in the case 1 are separated by disposing the longitudinal beam 2, so that the gas and the ejections discharged from the thermal runaway battery cell 5 will not contact the battery cells 5 in the accommodating area on other side, so as to avoid that the battery cells 5 in the accommodating area on the other side is affected to cause the battery cells 5 in the whole case 1 to be thermal runaway.

For example, the explosion-proof valve is directly opposite to the through-hole 41, and a projection of the explosion-proof valve along a height direction of the battery cell 5 falls within the through hole 41, so that the through hole 41 can provide enough space for an opening of the explosion-proof valve, so that the explosion-proof valve can be opened smoothly, and an opening angle is unrestricted, so that the gas generated in the battery cell 5 can enter the pressure relief cavity through the through hole 41 at a first time when the thermal runaway occurs in the battery cell 5, and be discharged through the exhaust port.

For example, a shape of the through hole 41 can be a same as a shape of the explosion-proof valve. For example, a size of the through hole 41 is greater than a size of the explosion-proof valve to avoid restricted opening of the explosion-proof valve.

In the embodiment, the longitudinal beam 2 is disposed in the case 1, the longitudinal beam 2 extends along an X direction. The longitudinal beam 2 divides the case 1 into two accommodating areas, that is, an area marked by a dotted line in FIG. 1, and each of the accommodating areas can be disposed with at least one battery cell group.

For example, the case 1 includes a bottom guard plate 11 and side plates. Each side of the bottom guard plate 11 is connected with a side plate. A plurality of side plates and the bottom guard plate 11 define a slot structure with an opening at a top of the slot structure. The longitudinal beam 2 is disposed on the bottom guard plate 11, and a bottom surface of the longitudinal beam 2 is fully in contact with the bottom guard plate 11.

In the embodiment, the bottom guard plate 11 is approximatively rectangular, and four side plates are disposed. The four side plates include two left and right side plates 13, a front side plate 12, and a rear side plate 14. The two left and right side plates 13 are arranged along a Y direction, and the front side plate 12 and the rear side plate 14 are arranged along the X direction.

In order to increase a quantity of the battery cells 5 in the case 1 and facilitate installation, the case 1 is also provided with a cross beam 3. The cross beam 3 is located in the accommodating areas and is disposed at an included angle with the longitudinal beam 2. The cross beam 3, the longitudinal beam 2, and inner walls of the case 1 define positioning grooves, and the tray 4 is arranged in the positioning groove. By disposing the cross beam 3, each of the accommodating areas can be separated into at least two mounting positions b, and each of the mounting positions b can be installed with a battery cell group. This arrangement enables the plurality of battery cells 5 in the case 1 to be divided into a plurality of groups for installation, which facilitates adaptive adjustment of a quantity of the battery cell groups according to the specific capacity of the case 1, and an assembly method is more flexible.

For example, the cross beam 3 and the longitudinal beam 2 protrude from the bottom surface of the case 1, so that the cross beam 3, the longitudinal beam 2, and the inner walls of the case 1 define the positioning grooves, and the tray 4 is disposed in the positioning groove, so that the positioning groove has a positioning effect on the tray 4, which facilitates the installation and fixation of the tray 4.

In order to prevent the gas in the pressure relief cavity from entering a space above the tray 4 through an assembly gap between the tray 4 and the positioning groove and contacting with the battery cell 5 when the thermal runaway occurs in the battery cell 5, the positioning groove is provided with a first mounting surface surrounding a circumference of the tray 4. The tray 4 has a second mounting surface, the second mounting surface abuts against the first mounting surface, and flatness of the second mounting surface and flatness of the first mounting surface are respectively not greater than 0.5 mm.

By controlling the flatness of the first mounting surface and the flatness of the second mounting surface, the embodiment can control the assembly gap between the first mounting surface and the second mounting surface within a small range, and the gas in the pressure relief cavity within the range cannot pass through the assembly gap, so as to prevent the gas generated from entering the space above the tray 4 when the thermal runaway occurs in the battery cell 5, thus the thermal runaway of the battery cell 5 is prevented from spreading, which is beneficial to improve the safety performance of the battery module.

In addition, by controlling the flatness of the first mounting surface and the flatness of the second mounting surface, there is no need to dispose a seal between the first mounting surface and the second mounting surface, which is conducive to simplifying a structure of the battery module and reducing the difficulty of assembly.

For example, the flatness of the first mounting surface and the flatness of the second mounting surface may be respectively 0.4 mm, 0.3 mm, 0.2 mm, or 0.1 mm.

In other embodiments, a seal is disposed between the first mounting surface and the second mounting surface to seal the assembly gap between the first mounting surface and the second mounting surface; the seal can also prevent the gas in the pressure relief cavity from entering the space above the tray 4 through the assembly gap, thus the thermal runaway of the battery cell 5 is prevented from spreading.

In the embodiment, the cross beam 3 extends along the Y direction, wherein the X direction is perpendicular to the Y direction, so that each of the mounting positions is approximately rectangular with a regular shape, which is convenient for an arrangement of the battery cells 5 in each battery cell group, and is beneficial to make full use of the space inside the case 1.

For example, the tray 4 includes a tray body and a fixing flange arranged circumferentially around the tray body, and the second mounting surface is located at a bottom surface of the fixing flange. The positioning groove is a stepped groove and includes an upper groove body and a lower groove body. A size of the upper groove body is greater than a size of the lower groove body, so that a connection position of the upper groove body and the lower groove body defines a step supporting surface, and the step supporting surface is the first mounting surface. For example, bottoms of the side walls of the case 1 surrounding the positioning groove are convex with a fixed boss, the fixed boss, the cross beam 3, and the longitudinal beam 2 define the lower groove body, a top surface of the fixed boss, a top surface of the cross beam 3, and a top surface of the longitudinal beam 2 define the step supporting surface, and tops of the side walls of the case 1 define the upper groove body. The fixing flange is lap-jointed on the step supporting surface, and the tray body is located in the lower groove body, so that the bottom surface of the tray 4 can be spaced from the bottom guard plate 11 to define the pressure relief cavity. For example, the fixing flange can be fixedly connected with the step supporting surface through screws, which is convenient for installation.

For example, a quantity of the cross beams 3 and a quantity of the longitudinal beam 2 can be determined according to a specific size of case 1. In the embodiment, as shown in FIG. 2, the battery model includes one longitudinal beam 2 and two cross beams 3 namely a first cross beam 31 and a second cross beam 32. The first cross beam 31 is disposed in a middle part of the longitudinal beam 2 and defines a cross shape with the longitudinal beam 2. A middle part of the second cross beam 32 abuts against an end of the longitudinal beam 2. The longitudinal beam 2, two cross beams 3, and two accommodating areas and four mounting positions b are defined by the longitudinal beam 2, the two cross beams 3, and the case 1, and each of the mounting positions b is provided with a battery cell group.

In related technologies, the plurality of battery cells 5 in the case 1 are generally disposed on a frame body with a greater size, and the frame body is fixed in the case 1 by gluing. Due to the greater size of the frame body, generally only four sides are fixed to the case 1, resulting in insufficient support in a middle part of the frame body, and the frame body is easily deformed. Therefore, this kind of structure has high requirements on a strength of the frame body, and also increases requirements on an adhesive bonding effect, which is difficult to manufacture and high in production cost.

In the embodiment, by disposing the cross beam 3 and the longitudinal beam 2 in the case 1, a strength of the case 1 can be improved, and material requirements of the case 1 can be reduced. The space in the case 1 is divided into the plurality of mounting positions b with smaller dimensions through the cross beam 3 and the longitudinal beam 2. Using a plurality of small-sized trays 4 to replace the frame body with a greater size in the related technologies increases the strength of each of the trays 4, improves the stability of a structure of the battery cell group, and reduces requirements for a fixing strength of the tray 4, which is conducive to reducing manufacturing difficulty and cost.

For example, the case 1 is also provided with a reinforcing block 8, the reinforcing block 8 is disposed in the positioning groove and at a corner of the positioning groove. The reinforcing block 8 respectively abuts against or connected to two adjacent side walls of the positioning groove to improve the strength of the case 1.

In the embodiment, the positioning groove is a rectangular groove, and four corners of the positioning groove are all provided with reinforcing blocks 8 to improve the strength of the case 1. For example, a connection between the cross beam 3 and the fixed boss, a connection between the cross beam 3 and the longitudinal beam 2, and a connection between the longitudinal beam 2 and the fixed boss are all provided with the reinforcing blocks 8.

In order to simplify the structure of the case 1, a group of exhaust ports are disposed on the case 1 corresponding to each of the accommodating areas, and a plurality of pressure relief cavities in a same accommodating area are communicated, so that the plurality of mounting positions b in the same accommodating area share the group of exhaust ports.

In the embodiment, each group of exhaust ports includes two exhaust ports to increase exhaust flow. In other embodiments, each group of exhaust ports may also be correspondingly provided with one exhaust port, three exhaust ports, or more exhaust ports.

In order to communicate the plurality of pressure relief cavities in the same accommodating area, at least part of the cross beam 3 is spaced from the bottom guard plate 11, so that adjacent pressure relief cavities can be communicated through the gap between the cross beam 3 and the bottom guard plate 11.

Figure 3:
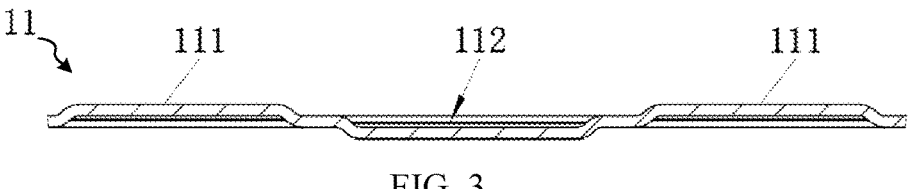
FIG. 3 is a partial schematic structural diagram of a bottom guard plate provided by the present application.

As shown in FIG. 3, in the embodiment, the bottom guard plate 11 is provided with a ridge 111 and a groove 112 arranged at intervals. Both the ridge 111 and the groove 112 extend along the length direction of the longitudinal beam 2, and the longitudinal beam 2 is fixed on the ridge 111. On one hand, a strength of the bottom guard plate 11 can be improved by disposing the ridge 111 and the groove 112 on the bottom guard plate 11. On another hand, the longitudinal beam 2 can be installed on the ridges 111 to ensure full contact between the longitudinal beam 2 and the ridge 111, so as to separate the two accommodating areas.

In addition, the battery module includes a plurality rows of battery cell groups, each row of battery cell groups includes a plurality of battery cells 5 located on a same tray 4, each row of battery cell groups is arranged along the length direction of the longitudinal beam 2, and the plurality rows of battery cell groups are arranged along a length direction of the cross beam 3. Combined with the arrangement of the ridges 111 and the grooves 112, exhaust positions of each battery cell 5 in each row of battery cell groups are same, and exhaust positions of different battery cell groups can be different. For example, the exhaust positions of some battery cell groups are directly opposite to the ridge 111, the exhaust positions of some battery cell groups are directly opposite to the groove 112, and the exhaust positions of some battery cell groups are located at a junction of the ridge 111 and the groove 112, so that exhaust heights of different battery cell groups are different, so that the gas is dispersed in the pressure relief cavity. The exhaust of each row of cell groups is relatively independent, improving a safety factor of the battery module.

For example, the cross beam 3 abuts against the ridge 111. By making the cross beam 3 abut against the ridge 111, the cross beam 3 is spaced with the groove 112 to ensure that the cross beam 3 is partially contacted with the bottom guard plate 11, so as to connect the pressure relief cavity in the same receiving area.

In the embodiment, by arranging independent pressure relief accommodating areas and grooves 112 and ridges 111 extending along the longitudinal direction of the longitudinal beam 2, each of the accommodating areas can achieve independent pressure relief and directional pressure relief, which can ensure that the gas generated by thermal runaway can be quickly discharged out of the body 1, and reduce the exhaust pressure of each of the accommodation areas, so that the exhaust pressure of each side accommodation area is not higher than 15 kPa. On a basis of a same quantity of battery cells 5 and a same volume of the case 1, the battery module can improve the safety factor.

For example, as shown in FIG. 2 and FIG. 3, the exhaust ports are disposed at one or both ends of the case 1 along the length direction of the longitudinal beam 2, so that the gas in the pressure relief cavity flows along the length direction of the longitudinal beam 2 and is discharged through the exhaust ports. For example, the exhaust port is disposed on the front side plate 12. Since the groove 112 extends along the length direction of the longitudinal beam 2, the groove 112 has a function of guiding the airflow, and facilitating the gas flow to the exhaust port for discharge, so as to ensure that when the thermal runaway occurs in the battery cell 5, the gas and the ejections generated in the battery cell 5 can be discharged quickly along the groove 112 through the exhaust port, thereby improving the safety of the battery module, and preventing thermal runaway of the battery cells 5 of the entire battery module.

For example, in order to ensure that the ridge 111 is in full contact with the longitudinal beam 2, one of the plurality of ridges 111 is provided with a mounting surface, the mounting surface fits with a bottom surface of the longitudinal beam 2, and the longitudinal beam 2 is fixed on the mounting surface. A shape of the mounting surface is same as a shape of the bottom surface of the longitudinal beam 2 to ensure that the mounting surface and the bottom surface of the longitudinal beam 2 can fully fit.

In the embodiment, the bottom surface of the longitudinal beam 2 is a plane, and correspondingly, the mounting surface is the plane.

In order to make the mounting position of the longitudinal beam 2 more flexible, each ridge 111 has the mounting surface, and the longitudinal beam 2 can be installed on any ridge 111 according to actual needs.

For example, a first seal is disposed between the longitudinal beam 2 and the mounting surface. The first seal is sandwiched between the longitudinal beam 2 and the mounting surface, which can block the gap between the longitudinal beam 2 and the mounting surface to improve a sealing effect between the longitudinal beam 2 and the mounting surface.

For example, the first seal extends along the length direction of the longitudinal beam 2 to improve the sealing effect between the longitudinal beam 2 and the mounting surface.

For example, the longitudinal beam 2 and the cross beam 3 can be fixed with the bottom guard plate 11 by bolts or by welding, clamping, or bonding.

Figure 4:
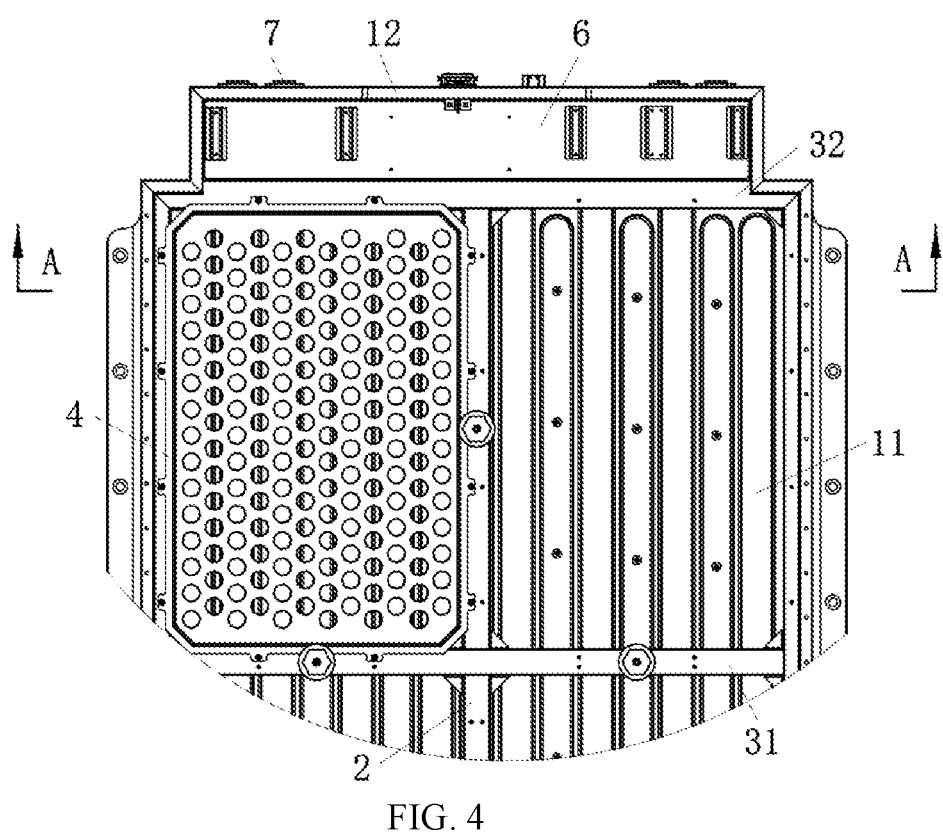
FIG. 4 is a top view of a partial structure of the battery module provided by the present application.
Figure 5:
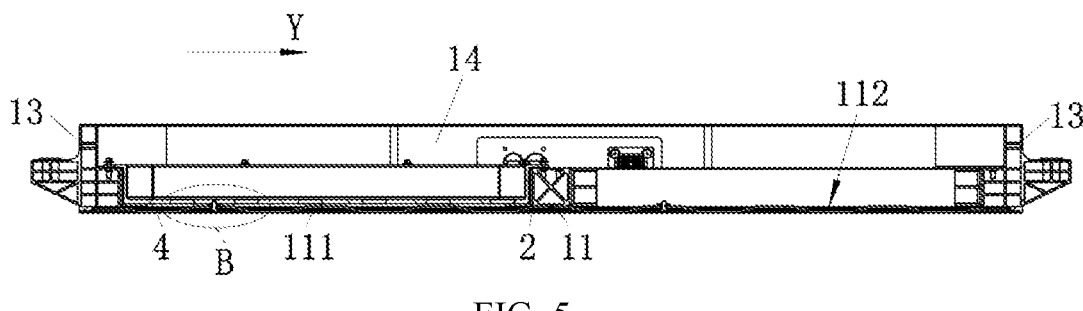
FIG. 5 is a cross-sectional view of the structure in FIG. 4 along A-A.
Figure 6:
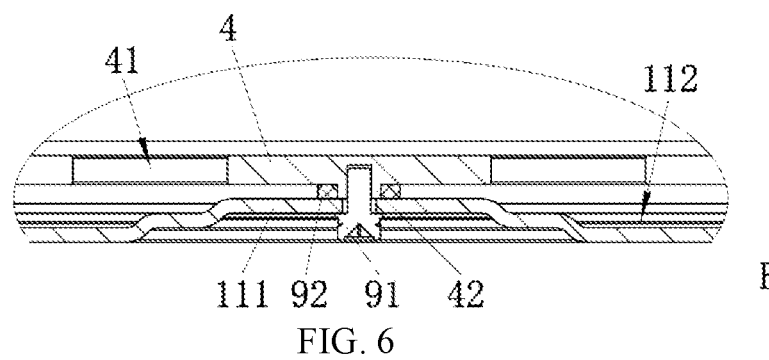
FIG. 6 is a partial enlarged view at B in FIG. 5.

In order to avoid a deformation of the middle of the tray 4 affected by the gravity of the battery cell 5 and affect the normal exhaust of the pressure relief cavity, the bottom surface of the tray 4 and the bottom guard plate 11 are fixed by the tray fixed bolts 91 as shown in FIGS. 4-6, the bottom surface of the tray 4 and the bottom guard plate 11 are fixed by the tray fixed bolts 91. On one hand the tray fixed bolts 91 can fix the tray 4 with the case 1, and on another hand, the tray fixed bolts 91 can support the tray 4 to avoid the deformation of the tray 4.

For example, the tray fixed bolt 91 passes through the bottom guard plate 11 from a bottom of the bottom guard plate 11 and is fixed with the tray 4 to prevent the tray fixed bolt 91 from affecting the layout of plurality of battery cells 5 on the tray 4.

In order to ensure the fixing effect of the tray fixed bolt 91 and the tray 4, a fixed boss 42 is provided on a back of the tray 4, a threaded hole is defined on the fixed boss 42, and a connecting hole is defined on the bottom guard plate 11. The tray fixed bolt 91 passes through the connecting hole and is threaded with the threaded hole. By disposing the fixed boss 42, a thickness of the tray 4 can be increased locally to ensure a depth of the threaded hole, so as to improve a screw fitting depth of the tray fixed bolt 91 and the tray 4, thus improving the fixing effect of the tray fixed bolt 91 and the tray 4 and a supporting stability of the tray 4.

In order to prevent the pressure relief cavity from exhausting through the connecting hole due to the connecting hole, a second seal 92 is disposed between the fixed boss 42 and the bottom guard plate 11 to seal the connecting hole. In addition, the second seal 92 can also avoid transitional compression between the fixed boss 42 and the bottom guard plate 11, which is conducive to protecting the tray 4 and the bottom guard plate 11.

For example, the second seal 92 is sleeved outside the fixed boss 42 and elastically abuts against the bottom guard plate 11. The arrangement structure is more compact, and the fixed boss 42 can position the second seal 92.

For example, the connecting hole is disposed on the ridge 111, that is, the tray fixed bolt 91 fixedly connects the bottom guard plate 11 and the ridge 111. This kind of arrangement can reduce a distance between the bottom guard plate 11 and the tray 4, which is conducive to reducing a height of the fixed boss 42, thus reducing cost and improving a strength of a connection position between the bottom guard plate 11 and the tray 4.

Figure 7:
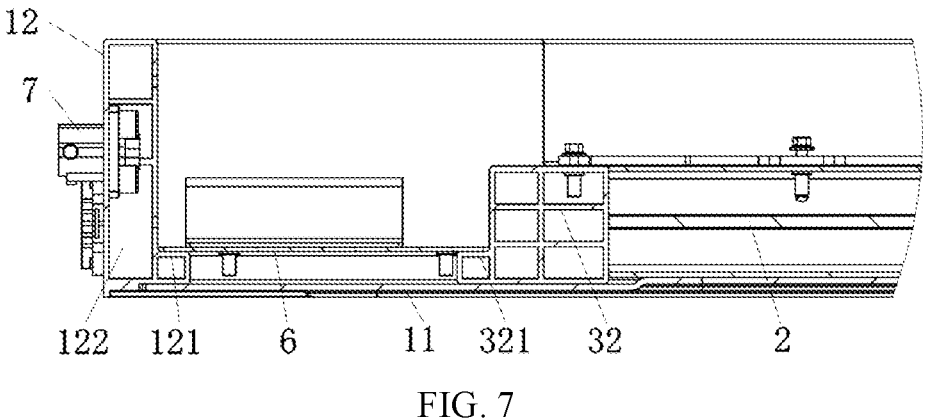
FIG. 7 is a cross-sectional view of a partial structure of the battery module provided by the present application.

Since the battery module also needs to be equipped with electrical components, in order to provide space for installing the electrical components, in the embodiment, the second cross beam 32 and the front side plate 12 are arranged at intervals, and a sealing plate 6 is disposed between the second cross beam 32 and the front side plate 12, and the sealing plate 6 is configured to install the electrical components, as shown in FIG. 1, FIG. 2, and FIG. 7. The sealing plate 6 and the bottom guard plate 11 are arranged at intervals to define an exhaust channel, and the accommodating area on each side is communicated with the exhaust port on the front side plate 12 through the exhaust channel.

In order to facilitate the installation of the sealing plate 6, the front side plate 12 and the second cross beam 32 are both provided with supporting bosses, and edges of opposite sides of the sealing plate 6 are lap jointed on the supporting bosses, so that the sealing plate 6 is fixed. The supporting boss on the front side plate 12 is defined as a side plate supporting boss 121, and the side plate supporting boss 121 is disposed on a side of the front side plate 12 towards the second cross beam 32. The supporting boss of the second cross beam 32 is defined as a cross beam supporting boss 321, and the a cross beam supporting boss 321 is disposed on a side of the second cross beam 32 towards the front side plate 12.

For example, the sealing plate 6 can be fixed to the bottom guard plate 11 by a sealing plate fixing bolt. A structure and a fixing method of the sealing plate fixing bolt can refer to the tray fixed bolts 91, which will not be specifically introduced in the embodiment.

For example, third sealings are disposed between the sealing plate 6 and the cross beam supporting boss 321, and between the sealing plate 6 and the side plate supporting boss 121, so as to avoid the gas discharged when the thermal runway occurs in the battery cell from contacting the electrical components on the sealing plate 6.

In other embodiments, the sealing plate 6 can be fixed with the side plate supporting boss 121 and the cross beam supporting boss 321 by means of bonding, clamping, etc.

As shown in FIG. 7, the front side plate 12 is a hollow structure and connected with the pressure relief channel. The gas enters the front side plate 12 through the pressure relief channel and then is discharged through the exhaust port. A first cavity is provided with a plurality of baffles 122, the baffles divide the first cavity into a plurality of sub-cavities, and the exhaust port is communicated with the pressure relief channel through a sub-cavity. By disposing the baffles 122, the gas can be placed into other sub-cavities, which is conducive to achieving directional exhaust, so as to improve the exhaust speed and improve the safety performance of the battery module.

In the embodiment, a pressure relief valve 7 is disposed at the exhaust port. The pressure relief valve 7 can automatically opened when the exhaust pressure reaches a preset value, so that the exhaust port can automatically exhaust when exhaust is required and be closed when exhaust is not required. It should be noted herein that the pressure relief valve 7 can adopt any structure in the relevant technologies.

For example, both the cross beam 3 and the longitudinal beam 2 are respectively provided with a second cavity therein in their own length directions, and the second cavity is provided with ridge plates arranged crosswise. The gravity of the cross beam 3 and the longitudinal beam 2 can be reduced by disposing the cross beam 3 and the longitudinal beam 2 as hollow structures. The strength of the cross beam 3 and the longitudinal beam 2 can be improved by disposing the ridge plates.

The embodiment also provides an electric vehicle, including the above battery module. The electric vehicle adopts the above battery module, which can prevent the thermal runaway of one battery cell 5 from spreading to other battery cells 5, and avoid the thermal runaway of the whole battery module.

For example, the case 1 in the battery module can be formed on the electric vehicle to reduce a quantity of elements.

In the battery module provided by the present application, the accommodating areas located on both sides of the longitudinal beam in the case are separated by the longitudinal beam, so that the gas and the ejections discharged from the thermal runaway battery cell will not contact the battery cells in the accommodating area on the other side, so as to avoid affecting the battery cells in the accommodating area on the other side and causing the thermal runaway of the battery cells in the whole case.

In the electric vehicle provided by the present application, using the above battery module can prevent the thermal runaway of one battery cell from spreading to other battery cells and the thermal runaway of the whole battery module.

What is claimed is:

1. A battery module, comprising:
   a case provided with exhaust ports;
   a longitudinal beam disposed in the case and abutting against a bottom surface of the case to partition accommodating areas in the case on both sides of the longitudinal beam along a width direction;
   a tray disposed in one of the accommodating areas and configured to install a battery cell, wherein a through hole opposite to an end of the battery cell is defined on the tray, the tray is spaced from the bottom surface of the case to define a pressure relief cavity, the through hole and the exhaust ports are respectively communicated with the pressure relief cavity;
   the case comprises a bottom guard plate, each side of the bottom guard plate is connected to a side plate, cross beams are disposed in the accommodating areas; a front side plate is parallel to the cross beams, the front side plate is provided with the exhaust ports, and one of the cross beams is adjacent to the front side plate, a sealing plate is disposed between the front side plate and the one of the cross beams, the sealing plate is spaced from the bottom guard plate to define an exhaust channel, the exhaust channel is respectively communicated with the exhaust ports and the pressure relief cavity, and the sealing plate is configured to install electrical components;
   wherein the front side plate and the one of the cross beams are respectively provided with supporting bosses, and the sealing plate is lapped on the supporting bosses.

2. The battery module according to claim 1, wherein each of the cross beams is disposed at an included angle with the longitudinal beam, positioning grooves are defined with the cross beam, the longitudinal beam, and inner walls of the case, and the tray is disposed in one of the positioning grooves.

3. The battery module according to claim 2, wherein the cross beam is spaced from the bottom of the case to communicate two adjacent positioning grooves.

4. The battery module according to claim 2, wherein the case comprises a bottom guard plate, the bottom guard plate is provided with ridges and grooves arranged at intervals, the ridges and the grooves extend along a length direction of the longitudinal beam respectively, and the longitudinal beam is fixed on one of the ridges.

5. The battery module according to claim 4, wherein the cross beam abuts against the ridges.

6. The battery module according to claim 4, wherein at least one of the ridges comprises a mounting surface, the mounting surface is fitted with a bottom surface of the longitudinal beam, and the longitudinal beam is fixed on the mounting surface;
   a first seal is disposed between the longitudinal beam and the mounting surface.

7. The battery module according to claim 4, wherein the tray is fixed to the bottom guard plate by a tray fixed bolt;
   the tray fixed bolt connects one of the ridges and the tray.

8. The battery module according to claim 7, wherein a fixed boss is provided on a back of the tray, a threaded hole is defined on the fixed boss, and the tray fixed bolt passes through the bottom guard plate and is threaded with the threaded hole.

9. The battery module according to claim 8, wherein a second seal is disposed between the fixed boss and the bottom guard plate;

the second seal is sleeved outside the fixed boss and elastically abuts against the bottom guard plate.

10. The battery module according to claim 1, wherein the front side plate is provided with a first cavity, the first cavity is provided with a plurality of baffles, the baffles divide the first cavity into a plurality of sub-cavities, and the exhaust ports on the front side plate are communicated with the exhaust channel through one of the sub-cavities.

11. The battery module according to claim 4, wherein the case is provided with the exhaust ports corresponding to one of the accommodating areas, and the exhaust ports are communicated with the pressure relief cavity of a corresponding one of the accommodating areas;

the exhaust ports are disposed at an end or both ends of the case along the length direction of the longitudinal beam.

12. The battery module according to claim 1, wherein each of the exhaust ports is provided with a pressure relief valve.

13. The battery module according to claim 1, wherein an end of the battery cell is provided with an explosion-proof valve, the explosion-proof valve is directly opposite to the through hole, and the explosion-proof valve is projected in the through hole along a height direction of the battery cell.

14. The battery module according to claim 1, wherein each of the cross beams is disposed at an included angle with the longitudinal beam, positioning grooves are defined with the cross beam, the longitudinal beam, and inner walls of the case, and the tray is disposed in one of the positioning grooves;

the battery module further comprises a reinforcing block, wherein the reinforcing block is arranged in one of the positioning grooves and at a corner, and the reinforcing block respectively abuts against or connected to two adjacent of the cross beam, the longitudinal beam and a corresponding one of the inner walls of the case.

15. The battery module according to claim 1, wherein each of the cross beams is disposed at an included angle with the longitudinal beam, positioning grooves are defined with the cross beam, the longitudinal beam, and inner walls of the case, and the tray is disposed in one of the positioning grooves;

the cross beam and the longitudinal beam are respectively provided with a second cavity therein along their own length directions, and ridge plates are cross-arranged and disposed in the second cavity.

16. The battery module according to claim 1, wherein each of the cross beams is disposed at an included angle with the longitudinal beam, positioning grooves are defined with the cross beam, the longitudinal beam, and inner walls of the case, and the tray is disposed in one of the positioning grooves;

each of the positioning grooves is a stepped groove and comprises an upper groove body and a lower groove body communicated with each other, and a connection of the upper groove body and the lower groove body defines a step supporting surface;

the tray comprises a tray body and a fixing flange arranged circumferentially around the tray body, the tray body is located in the lower groove body, and the fixing flange is overlapped with the step supporting surface.

17. The battery module according to claim 1, wherein each of the cross beams is disposed at an included angle with the longitudinal beam, positioning grooves are defined with the cross beam, the longitudinal beam, and inner walls of the case, and the tray is disposed in one of the positioning grooves;

each of the positioning grooves is provided with a first mounting surface surrounding a circumference of the tray, the tray comprises a second mounting surface, the second mounting surface abuts against the first mounting surface, and a flatness of the second mounting surface and a flatness of the first mounting surface are less than or equal to 0.5 mm, respectively.

18. An electric vehicle, comprising a battery module; the battery module comprising:

a case provided with exhaust ports;

a longitudinal beam disposed in the case and abutting against a bottom surface of the case to partition accommodating areas in the case on both sides of the longitudinal beam along a width direction;

a tray disposed in one of the accommodating areas and configured to install a battery cell, wherein a through hole opposite to an end of the battery cell is defined on the tray, the tray is spaced from the bottom surface of the case to define a pressure relief cavity, the through hole and the exhaust ports are respectively communicated with the pressure relief cavity;

the case comprises a bottom guard plate, each side of the bottom guard plate is connected to a side plate, cross beams are disposed in the accommodating areas; a front side plate is parallel to the cross beams, the front side plate is provided with the exhaust ports, and one of the cross beams is adjacent to the front side plate, a sealing plate is disposed between the front side plate and the one of the cross beams, the sealing plate is spaced from the bottom guard plate to define an exhaust channel, the exhaust channel is respectively communicated with the exhaust ports and the pressure relief cavity, and the sealing plate is configured to install electrical components;

wherein the front side plate and the one of the cross beams are respectively provided with supporting bosses, and the sealing plate is lapped on the supporting bosses.

* * * * *